US012732239B2

(12) United States Patent
Kotaru et al.

(10) Patent No.: US 12,732,239 B2
(45) Date of Patent: Sep. 8, 2026

(54) SYSTEMS AND METHODS FOR ADAPTIVE BEAMFORMING USING A STOCHASTIC GRADIENT DESCENT PUFFERFISH OPTIMIZATION ALGORITHM

(71) Applicant: Verizon Patent and Licensing Inc., Basking Ridge, NJ (US)

(72) Inventors: Kiran Kotaru, Hyderabad (IN); Sreenu Chukka, Visakhapatnam (IN); Laxmikanth Bathula, Kondapur (IN); Srinivasarao Sudhirkashyap, Bengaluru (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/893,502

(22) Filed: Sep. 23, 2024

(65) Prior Publication Data

US 2026/0088863 A1 Mar. 26, 2026

(51) Int. Cl.
*H04B 7/0456* (2017.01)

(52) U.S. Cl.
CPC .................................. *H04B 7/0456* (2013.01)

(58) Field of Classification Search
CPC .................................................... H04B 7/0456
See application file for complete search history.

(56) References Cited

U.S. PATENT DOCUMENTS 10,574,320 B1 * 2/2020 Music .................. H04B 7/0854
2002/0146029 A1 * 10/2002 Kavak ................ H04J 13/0048 370/441
2006/0079289 A1 * 4/2006 Lewis ...................... H01Q 3/42 455/562.1
2007/0147533 A1 * 6/2007 Thomas ............... H04B 7/0617 375/267
2007/0249404 A1 * 10/2007 Gao ....................... H04B 7/086 455/562.1
2018/0375552 A1 * 12/2018 Athley ................ H01Q 3/2652
2022/0329289 A1 * 10/2022 Huang .................. H04B 7/024
2024/0107443 A1 * 3/2024 Singh ...................... H04B 7/08

OTHER PUBLICATIONS

M. Kanaka Chary, C.H. Vamshi Krishna, D. Rama Krishna. Accurate channel estimation and hybrid beamforming using Artificial Intelligence for massive MIMO 5G systems. AEUE—International Journal of Electronics and Communications; 173 (2024) 154971; 17 pages.

Jiajia Guo, Tong Chen, Shi Jin, Geoffrey Ye Li, Xin Wang, Xiaolin Hou. Deep learning for joint channel estimation and feedback in massive MIMO systems. Digital Communications and Networks 10 (2024); pp. 83-93.

(Continued)

*Primary Examiner* — Jean B Corrielus

(57) ABSTRACT

A device may include a processor configured to receive wireless signals transmitted by a transmitting antenna array. The processor may be further configured to determine weights for a receiving antenna array based on the received wireless signals using a pufferfish optimization algorithm; perform adaptive beamforming on the receiving antenna array using the determined weights; and use the beamformed receiving antenna array to receive additional wireless signals transmitted by the transmitting antenna array.

20 Claims, 8 Drawing Sheets

(56) References Cited

OTHER PUBLICATIONS

Rui Zhang, Loncheng Yang, Maobin Tang, WeiJie Tan, and Juan Zhao. Channel Estimation for mmWave Massive MIMO Systems With Mixed-ADC Architecture. IEEE Open Journal of the Communications Society; vol. 4, 2023; pp. 606-613.
Nhan Thanh Nguyen, Mengyuan Ma, Ortal Lavi, Nir Shlezinger, Yonina C. Eldar, A. L. Swindlehurst, and Markku Juntti. Deep Unfolding Hybrid Beamforming Designs for THz Massive MIMO Systems. Feb. 23, 2023; 13 pages.
Spyros Lavdas, Panagiotis K. Gkonis, Efthalia Tsaknaki, Lambros Sarakis, Panagiotis Trakadas, and Konstantinos Papadopoulos. A Deep Learning Framework for Adaptive Beamforming in Massive MIMO MillimeterWave 5G Multicellular Networks. Electronics 2023, 12, 3555; 16 pages.
Osama Al-Baik, Saleh Alomari, Omar Alssayed, Saikat Gochhait, Irina Leonova, Uma Dutta , Om Parkash Malik Zeinab Montazeri, and Mohammad Dehghani. Pufferfish Optimization Algorithm: A New Bio-Inspired Metaheuristic Algorithm for Solving Optimization Problems. Biomimetics 2024, 9, 65; 54 pages.
Chen Hu, Linglong Dai, Talha Mir, Zhen Gao, and Jun Fang. Super-Resolution Channel Estimation for MmWave Massive MIMO with Hybrid Precoding. Jul. 8, 2018, 5 pages.
Mikhail Bakulin, Vitaly Kreyndelin, Andrey Rog, Dmitry Petrov, Sergei Melnik. MMSE Based K-best Algorithm for Efficient. MIMO Detection. 2017 9th International Congress on Ultra Modern Telecommunications and Control Systems and Workshops (ICUMT); pp. 358-363.
Weifeng Liu, Puskal P. Pokharel, and Jose C. Principe. The Kernel Least Mean Square Algorithm. IEEE Transactions on Signal Processing • Mar. 2008; 27 pages.
Da Li, Jingjing Wu, and Qingrun Zhang. Stochastic Gradient Descent in the Viewpoint of Graduated Optimization. Aug. 13, 2023; 23 pages.
Sooyoung Hur, Taejoon Kim, David J. Love, James V. Krogmeier, Timothy A. Thomas, and Amitava Ghosh. Millimeter Wave Beamforming for Wireless Backhaul and Access in Small Cell Networks. Jun. 27, 2013; 34 pages.
Ahmed Alkhateeb, Omar El Ayach, Geert Leus, and Robert W. Heath Jr. Channel Estimation and Hybrid Prec. oding for Millimeter Wave Cellular Systems. Jan. 29, 2014, 36 pages.
Tewelgn Kebede, Yihenew Wondie, Johannes Steinbrunn, Hailu Belay Kassa, Kevin T. Kornegay. Precoding and Beamforming Techniques in mmWave-Massive MIMO: Performance Assessment. IEEE Access vol. 10, 2022, pp. 16365-16387.
Hengtao He, Chao-Kai Wen, Shi Jin, and Geoffrey Ye Li. Deep Learning-Based Channel Estimation for Beamspace mmWave Massive MIMO Systems. IEEE Wireless Communications Letters, vol. 7, No. 5, Oct. 2018; pp. 852-855.
Hao Ye, Geoffrey Ye Li, and Biing-Hwang Juang. Power of Deep Learning for Channel Estimation and Signal Detection in OFDM Systems. IEEE Wireless Communications Letters, vol. 7, No. 1, Feb. 2018; pp. 114-117.
Eren Balevi, Akash Doshi, and Jeffrey G. Andrews. Massive MIMO Channel Estimation with an Untrained Deep Neural Network. Jul. 31, 2019, 31 pages.
Shahid Hamid, Shakti Raj Chopra, Akhil Gupta, Sudeep Tanwar, Bogdan Cristian Florea, Dragos Daniel Taralunga, Osama Alfarraj, and Ahmed M. Shehata. Hybrid Beamforming in Massive MIMO for Next-Generation Communication Technology. Sensors 2023, 23, 7294; 13 pages.
Johanna Ketonen, Markku Juntti, Jari Ylioinas, and Joseph R. Cavallaro. Implementation of LS, MMSE and SAGE Channel Estimators for Mobile MIMO-OFDM. 2012 Conference Record of the Forty Sixth Asilomar Conference on Signals, Systems and Computers. 2012; 6 pages.
Revati Joshi and Ashwinikumar Dhande. Adaptive Beamforming Using LMS Algorithm. IJRET: International Journal of Research in Engineering and Technology. vol. 03 Issue: 05, May 2014; pp. 589-593.

* cited by examiner

SYSTEMS AND METHODS FOR ADAPTIVE BEAMFORMING USING A STOCHASTIC GRADIENT DESCENT PUFFERFISH OPTIMIZATION ALGORITHM

BACKGROUND INFORMATION

To satisfy the needs and demands of users of mobile communication devices, providers of wireless communication services continue to improve and expand available services as well as networks used to deliver such services. One aspect of such improvements includes increasing data rates at which mobile communication devices are able receive and send information. Data rates may be increased by using multiple antennas. Managing multiple antennas may pose various challenges.

DETAILED DESCRIPTION OF PREFERRED EMBODIMENTS

Figure 1:
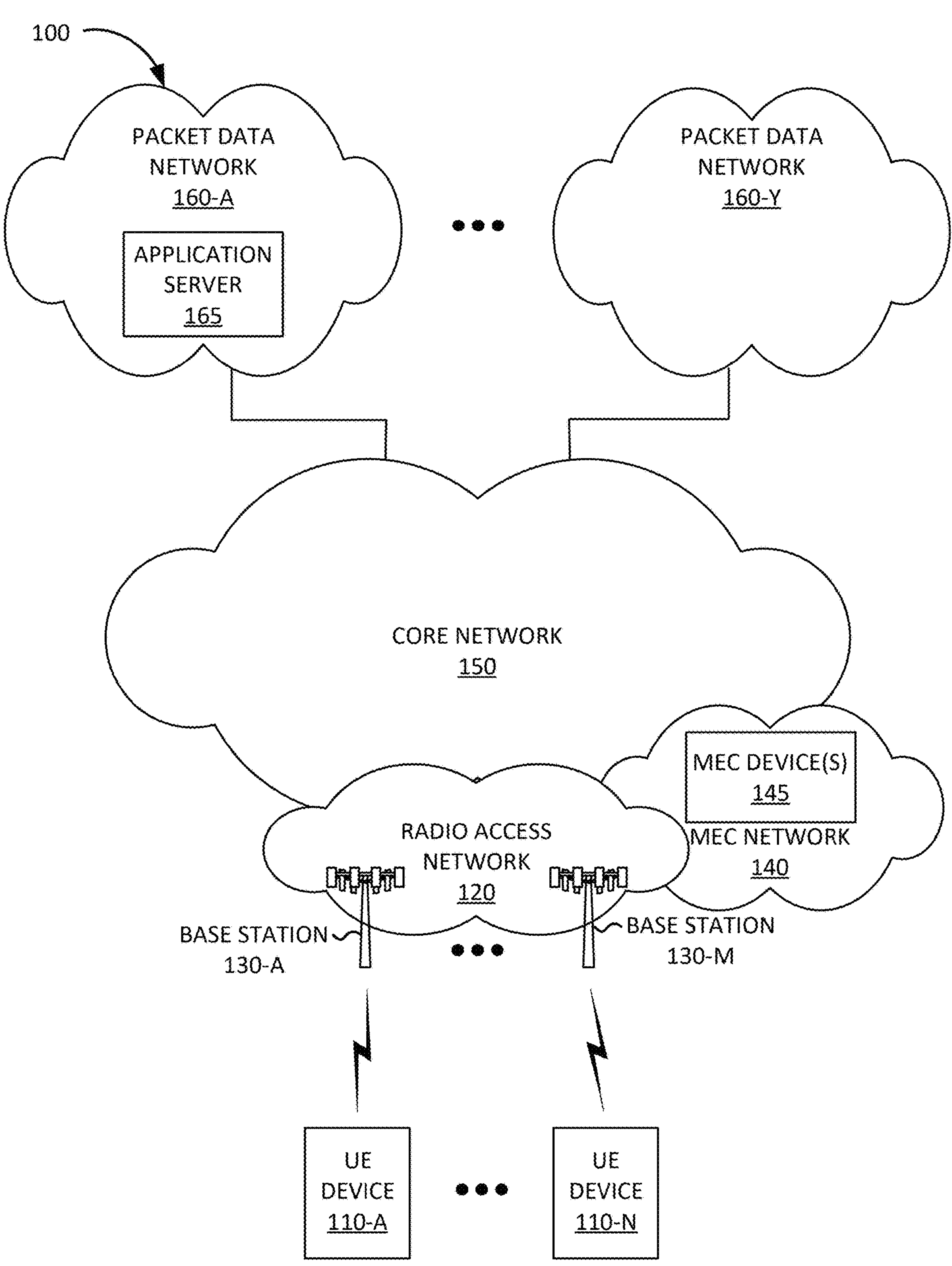
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable cellular wireless communication devices (e.g., smart phones, etc.), referred to as user equipment (UE) devices (also herein referred to as UEs), to connect to networks and obtain services via the provider's core network, such as a Fourth Generation (4G) core network, a Fifth Generation (5G) core network, and/or other next generation networks as defined by the $3^{rd}$ Generation Partnership Project (3GPP). 5G coverage may be provided using 5G base stations, referred to as gNodeBs, which implement the 5G New Radio (NR) air interface. In order to establish a communication session, a UE device may establish a Protocol Data Unit (PDU) session with the core network, via the RAN. The PDU session may enable the UE device to communicate with another network via the RAN and core networks.

An aspect of improving the performance of a wireless communication network is the use of multiple-input and multiple-output (MIMO) adaptive antenna arrays by a base station and/or by UE devices. MIMO communication includes sending and receiving multiple data signals simultaneously over a same radio frequency (RF) channel using multiple antennas and/or antenna elements. For example, a UE device and a base station in a RAN may each include an adaptive antenna array with multiple antenna elements. If different antenna elements of a transmitting antenna array are able to transmit data with different signal propagation properties (e.g., by having different polarizations, etc.), a receiving antenna array may be able to receive and decode multiple signals simultaneously, thereby increasing the throughput of the data being transmitted. Thus, the use of MIMO adaptive antenna arrays may improve coverage, signal quality, and/or throughput.

An RF transmitter, such as an RF transmitter associated with a base station, may perform adaptive beamforming to generate multiple antenna beams pointing to multiple UE devices. An antenna beam may correspond to a radiation pattern focused in a particular direction and may be generated by logically grouping multiple antenna array elements and generating an antenna beam pattern through phase shifting and/or tunable complex gains applied to the antenna array elements. An optimum antenna array setting for a particular UE device may form an antenna beam directed toward the location of the particular UE device in such a way that the particular UE device receives signals at the maximum signal power and/or quality, while minimizing interference to other UE devices. An RF receiver may in turn perform beamforming to configure the antenna array elements to receive the signal from the transforming antenna array at the maximum available signal strength, quality, and/or throughput. The properties of a communication channel between the transmitting and receiving antenna arrays may vary due to factors such as changes in the environment and/or signal interference from other UE devices. Therefore, the beamforming may need to be adaptive, meaning that the configuration of the antenna array elements may need to be updated in real time.

Adaptive beamforming algorithms may adjust the weights applied to the antenna array elements based on channel state information (CSI) obtained for the communication channel. For example, the transmitter may send pilot signals in predetermined time slots and the receiver may compare the received pilot signals with expected pilot signals to determine the CSI. Various techniques have been developed to compute the weights for an antenna array based on the CSI. Examples of adaptive beamforming techniques include deep learning based hybrid beamforming (DLHB), Channel Estimation and Feedback network (CEFNet), SubManNet-based Connected Hybrid Beamforming (SC-HBF), and machine learning (ML) based adaptive beamforming. These techniques may suffer from various problems, such as increased noise in the communication channel, low performance, low convergence rates, high latency, and/or high computational cost.

Implementations described herein relate to systems and methods for adaptive beamforming using a stochastic gradient descent pufferfish optimization algorithm (also referred to herein as "stochastic gradient descent pufferfish optimization"). The use of stochastic gradient descent pufferfish optimization to determine weights for a MIMO antenna array may result in less noise, higher performance, higher convergence rates, lower latency, and/or lower computational cost. Stochastic gradient descent is a stochastic approximation of gradient descent optimization that calculates an estimated gradient descent using a randomly selected subset of the data used to calculate gradient descent optimization.

Before adaptive beamforming is performed based on received signals, an antenna array system may perform channel estimation using Minimum Mean Square Error (MMSE) filtering. MMSE filtering may be used to average out noise from received pilot symbols. An MMSE filter may be applied using Equation (Eq.) (1):

$$\hat{Z}^{MMSE}_{W_V,W_Q,P}(U) = O^S_{W_V,W_Q,P}(U)\hat{Z}^{LS}_{W_V,W_Q,P}, \qquad \text{Eq. (1)}$$

where $$\hat{Z}^{MMSE}_{W_V,W_Q,P}(U)$$

corresponds to the output of the MMSE filter for input signal U for the p-th tap from transmitter antenna WQ to receiver antenna WV, $$\hat{Z}^{LS}_{W_V,W_Q,P}$$

corresponds to the least squares (LS) estimate, and $$O^S_{W_V,W_Q,P}$$

corresponds to the filtering matrix.

The LS estimate for the p-th tap from transmitter antenna WQ to receiver antenna WV is expressed as $$\hat{Z}^{LS}_{W_V,W,P} = \left[\hat{Z}^{LS}_{W_V,W,P}(U_1) \ \ldots \ \hat{Z}^{LS}_{W_V,W,P}(U_{M_N})\right]^Q \in \wp^{M_N \times 1}, \qquad \text{Eq. (2)}$$

where MN denotes the number of Orthogonal Frequency Division Multiplexing (OFDM) symbols with pilot symbols in the filtering window, where M corresponds to the number of receiver antenna elements, and where N corresponds to the number of transmitter antenna elements. The filtering matrix $$O^S_{W_V,W_Q,P}$$

is given by $$O_{W_V,W_Q,P}(U) = \sum\nolimits^{-1}_{\hat{Z}^{XY}_{W_V,W_Q,P}} \sum\nolimits^{S}_{W_V,W_Q,P}, \qquad \text{Eq. (3)}$$

where $$\sum\nolimits^{S}_{W_V,W_Q,P}$$

corresponds to the cross-covariance matrix between $$\left[\hat{Z}^{LS}_{W_V,W,P}(U_n)\right]$$

and $$\hat{Z}^{LS}_{W_V,W,P},$$

and where $$\sum\nolimits^{-1}_{\hat{Z}^{XY}_{W_V,W_Q,P}}$$

corresponds to the auto-covariance matrix. The received input signal processed using the MMSE filter may be used as the input to the adaptive beamforming process.

Adaptive beamforming may include determining a set of weights y(m) for the elements of an antenna array based on the properties of an input signal z(m). The output X may be determined as $$X(m) = y^E(m) \cdot z(m), \qquad \text{Eq. (4)}$$

where $y^E(m)$ is the conjugate transpose matrix of the weights y. The error h(m) between the calculated output X(m) and the expected output n(m) is given as $$h(m) = n(m) - X(m). \qquad \text{Eq. (5)}$$

In other words, the error h(m) is the error between the expected pilot signals and the pilot signals that are calculated using the received pilot signals and the determined antenna array weights.

The relationship between the weights $y^z(m)=[y_1, y_2, \ldots y_p]^z$ at time m and the weights y(m+1) at time m+1 is given by $$y(m+1) = y(m) + \mu \cdot h(m) \cdot x(m), \qquad \text{Eq. (6)}$$

where μ is the step size. Adaptive beamforming that implements stochastic gradient descent pufferfish optimization is used to determine the weights y(m) at time m.

An optimization for a non-convex function (i.e., a function with local minima) may require a two-step process during each iteration of a numerical technique to calculate a global minimum as a solution to an optimization problem. A first step of an optimization process seeks a better solution by using, for example, gradient descent to move a candidate solution toward a minimum. A second step of the optimization process may apply a perturbation to the candidate solution in an attempt to prevent the candidate solution from getting trapped in a region leading to a local and non-global minimum. One class of optimization algorithms are based on the natural behavior of different types of animals. Pufferfish optimization is based on modeling the behavior of a pufferfish in response to a predator by simulating the approach of a predator to a slow-moving pufferfish, followed by inflation of the pufferfish as a defense mechanism, followed by retreat of the predator in response. A pufferfish optimization algorithm (POA) simulates these actions by an exploration phase that simulates a predator attack on a pufferfish, followed by an exploitation phase that simulates the defense mechanism of the pufferfish. Stochastic gradient descent is applied during the exploration phase to achieve a faster convergence rate and a higher computational efficiency, resulting in a stochastic gradient descent (SGD) pufferfish optimization algorithm (SPOA).

In the SPOA, a set of candidate solution is initialized with random values. Each candidate solution includes a set of n decision variables, which correspond to the antenna weights to be determined. The set of candidate solutions Y may be expressed as a matrix:

$$Y = \begin{bmatrix} Y_i \\ \vdots \\ Y_j \\ \vdots \\ Y_S \end{bmatrix}_{S\times n} = \begin{bmatrix} y_{1,1} & \cdots & y_{1,b} & \cdots & y_{1,n} \\ \vdots & \ddots & \vdots & \ddots & \vdots \\ y_{j,1} & \cdots & y_{j,b} & \cdots & y_{j,n} \\ \vdots & \ddots & \vdots & \ddots & \vdots \\ y_{S,1} & \cdots & y_{S,b} & \cdots & y_{S,n} \end{bmatrix}_{S\times n}, \quad \text{Eq. (7)}$$

where $y_j$ is the j-th candidate solution, $y_{j,b}$ is the b-th dimension (i.e., antenna weight) of the j—the solution, S is the number of candidate solutions, and n is the number of dimensions (i.e., antenna weights). Y is initialized using the following equation:

$$y_{j,b} = hc_b + t\cdot(pc_b - hc_b), \quad \text{Eq. (8)}$$

where $hc_b$ is the upper bound for the values for the b-th dimension, $pc_b$ is the lower bound for the values for the b—the dimension, and t is a random real number from the interval [0,1]. The initial values of Y are evaluated using the fitness criterion, which is the minimized error given by Eq. (5) above.

In the exploration phase, the position of the population members of Y is updated based on a simulated attack by a predator on a pufferfish. Each member of Y corresponds to a predator that selects another member of Y to attack if the other member's position is better than the predator's position. Thus, for each member $Y_j$ of Y, a set $DE_j$ of pufferfish is selected using the following criterion:

$$DE_j = \{Y_k : F(Y_k) < F(Y_j), \text{ and } j \neq k\}, \quad \text{Eq. (9)}$$

$$\text{where } j = 1, 2, \ldots S \text{ and } k \in \{1, 2, \ldots S\},$$

where $F(Y_k)$ is the fitness of $Y_k$ calculated using Eq. (5) and $F(Y_j)$ is the fitness of $Y_j$ also calculated using Eq. (5). From set $DE_j$, a pufferfish representing a candidate solution is selected randomly as the pufferfish attacked by the predator.

A new position for candidate solution $Y_j$ is then determined based on the selected pufferfish HM using the following equation:

$$Y_{j,f}^{m+1} = Y_{j,f}^{m} + t_{j,f}\cdot\left(HM_{j,f} - G_{j,f}\cdot Y_{j,f}^{m}\right), \quad \text{Eq. (10)}$$

and $$Y_j = \begin{cases} Y_j^{m+1}, & \text{if } F\left(Y_j^{m+1}\right) < F\left(Y_j^{m}\right) \\ Y_j^{m}, & \text{else} \end{cases}, \quad \text{Eq. (11)}$$

where $$Y_{j,f}^{m+1}$$

corresponds to the f-th dimension of j-th candidate solution for y(m+1), $$Y_{j,f}^{m}$$

corresponds to the f-th dimension of the selected pufferfish HM for the j-th candidate solution, $t_{j,f}$ corresponds to a random real number selected from the interval [0,1], $G_{j,f}$ is a number randomly selected from the set {1,2}, $$F\left(Y_j^{m+1}\right)$$

is the fitness of $$Y_j^{m+1},$$

and $$F\left(Y_j^{m}\right)$$

is the fitness of $$Y_j^{m}.$$

Eq. (10) may be rewritten as:

$$y(m+1) = y(m)\cdot[1 - t\cdot G] + t\cdot HM. \quad \text{Eq. (12)}$$

As stated above, the convergence rate of POA may be improved by using SGD. SGD may be computed using:

$$y(m+1) = y(m) - \alpha_m\cdot R(y(m), \varepsilon_m), \quad \text{Eq. (13)}$$

where $R(y(m),\varepsilon_m)$ represents the SGD of y(m) using selected samples $\varepsilon_m$ at step m, and $\alpha_m$ represents the step size at step m. Combining Eq. (12) and Eq. (13) yields:

$$y(m) = \frac{t\cdot HM + \alpha_m\cdot R(y(m-1), \varepsilon_m)}{t\cdot G}. \quad \text{Eq. (14)}$$

Substituting Eq. (14) into Eq. (6) yields:

$$y(m+1) = \frac{t\cdot HM + \alpha_m\cdot R(y(m-1), \varepsilon_m)}{t\cdot G} + \mu\cdot h(m)\cdot z(m), \quad \text{Eq. (15)}$$

which can be used to update the antenna weights using the SPOA technique.

The second phase of the SPOA corresponds to the exploitation phase of pufferfish optimization, in which the positions of the candidate solutions are updated based on a simulation of the defense mechanism of pufferfish, resulting in the predator moving some distance away from the pufferfish. This process is simulated using the following equation:

$$y_{j,f}(m+1) = y_{j,f}(m) + (1 - 2 \cdot t_{j,f}(m)) \cdot \frac{hc_f - pc_f}{a}, \quad \text{Eq. (16)}$$

where $hc_f$ is the upper bound for the values for the f-th dimension, pcr is the lower bound for the values for the f-th dimension, and t is a random real number from the interval [0,1], and a is the iteration counter. The result of Eq. (16) is then evaluated using Eq. (11) to determine whether to keep the previous position for the j—the candidate solution or whether to replace it with the new position computed using Eq. (16).

After Eq. (16), the best candidate solution from the set of candidate solutions Y is saved as the best solution found so far to complete one iteration of the SPOA process. The process of applying Eq. (9) through Eq. (16) is repeated over the selected number of iterations and/or until convergence based on a selected convergence criterion has been reached. The best solution found is then selected as the determined solution for the weights for the antenna array.

The above-described process may be implemented in a device that includes a MIMO antenna array, such as a base station and/or a UE device. For example, a device may be configured to receive wireless signals transmitted by a transmitting antenna array, perform channel estimation on the received wireless signals using a Minimum Mean Square Error (MMSE) algorithm, determine weights for a receiving antenna array based on the received wireless signals using a pufferfish optimization algorithm, perform adaptive beamforming on the receiving antenna array using the determined weights, and use the beamformed receiving antenna array to receive additional wireless signals transmitted by the transmitting antenna array.

Determining the weights for the receiving antenna array may include solving the pufferfish optimization algorithm using stochastic gradient descent. Determining the weights may further include generating a set of candidate solutions, and for each candidate solution, applying an exploration phase perturbation on a position associated with a candidate solution, from the set of candidate solutions, to determine a first new position based on a previous position, applying a fitness criterion to determine whether to accept the determined first new position or to retain the previous position. Determining the weights may further include, for each candidate solution, applying an exploitation phase perturbation on the accepted new position or retained previous position associated with the candidate solution to determine a second new position based on the accepted new position or retained previous position, and applying the fitness criterion to determine whether to accept the determined second new position or the accepted new position or retained previous position. The best solution may then be selected from the set of candidate solutions after each candidate solution has been processed.

Applying the exploration phase perturbation on the position associated with the candidate solution may include randomly selecting another solution from the set of candidate solution, that is associated with a better solution based on the fitness criterion and calculating the first new position based on the randomly selected other solution and a stochastic gradient descent of the previous solution.

Applying the exploitation phase perturbation on the accepted new position or retained previous position associated with the candidate solution may include calculating the second new position based on a random perturbation, selected from an interval of real numbers, of the accepted new position or retained previous position.

The fitness criterion used to evaluate the candidate solutions may include an error between an expected output and the weights for the receiving antenna array, multiplied by the received wireless signals. Applying the fitness criterion may include selecting the first new position when the first new position is associated with a smaller error and selecting the previous position when the previous position is associated with the smaller error.

The device may be further configured to compute a bit error rate (BER) and/or a mean square error (MSE) for the received additional wireless signals and determine a performance of the adaptive beamforming on the receiving antenna array using the determined weights based on the computed BER and/or MSE for the received additional wireless signals.

FIG. 1 is a diagram of an exemplary environment 100 in which the systems and/or methods described herein may be implemented. As shown in FIG. 1, environment 100 may include UE devices 110-A to 110-N(herein collectively referred to as "UE devices 110" and individually as "UE device 110"), a RAN 120 that includes base stations 130-A to 130-M (herein collectively referred to as "base stations 130" and individually as "base station 130"), a Multi-Access Edge Computing (MEC) network 140, a core network 150, and packet data networks (PDNs) 160-A to 160-Y (herein collectively referred to as "PDNs 160" and individually as "PDN 160").

UE device 110 may include any mobile device with cellular wireless communication functionality using a MIMO antenna array. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, a portable gaming system, and/or another type of portable computer; a Fixed Wireless Access (FWA) device; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

RAN 120 may include base stations 130 and be managed by a provider of wireless communication services. RAN 120 may enable UE devices 110 to connect to core network 150 via base stations 130 using cellular wireless signals. For example, RAN 120 may include one or more central units (CUs), distributed units (DUs), and/or Radio Units (RUs) (not shown in FIG. 1) that enable and manage connections from RUs to core network 150. RAN 120 may include features associated with an Long-Term Evolution (LTE), Advanced (LTE-A) network, a 5G network, and/or other next generation network, such as features for or associated with management of 5G NR base stations; carrier aggregation; advanced or massive MIMO configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A, 5G, and/or next generation functionality.

Base station 130 may include a 5G NR base station (e.g., a gNodeB) and/or a 4G LTE base station (e.g., an eNodeB). Base station 130 may include devices and/or components configured to enable cellular wireless communication with UE devices 110. For example, base stations 130 may include a radio frequency (RF) transceiver with a MIMO antenna array configured to communicate with UE devices 110 using a 5G NR air interface and a 5G NR protocol stack, a 4G LTE air interface and a 4G LTE protocol stack, and/or using another type of cellular air interface.

MEC network 140 may be associated with RAN 120 and may provide MEC services for UE devices 110 attached to base stations 130. MEC network 140 may be in proximity to base stations 130 from a geographic and network topology perspective, thus enabling low latency services to be provided to UE devices 110. As an example, MEC network 140 may be located on the same site as base station 130. As another example, MEC network 140 may be geographically closer to one of base stations 130 and reachable via fewer network hops and/or fewer switches, than other macro cell base stations 130.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services. In some implementations, MEC device 145 may perform some or all of an adaptive beamforming process as described herein for UE device 110 and/or for base station 130.

Core network 150 may be managed by the provider of cellular wireless communication services and may manage communication sessions of subscribers connecting to core network 150 via RAN 120. For example, core network 150 may establish an IP connection between UE devices 110 and PDN 160. The components of core network 150 may be implemented as dedicated hardware components and/or as Virtual Network Functions (VNFs) implemented on top of a common shared physical infrastructure using Software Defined Networking (SDN). For example, an SDN controller may implement one or more of the components of core network 150 using an adapter implementing a VNF virtual machine, a Cloud-Native Network Function (CNF) container, an event driven serverless architecture, and/or another type of SDN architecture. The common shared physical infrastructure may be implemented using one or more devices 300 described below with reference to FIG. 3 in a cloud computing center associated with core network 150. Additionally, or alternatively, at least some of the components of core network 150 may be implemented using MEC devices 145 in MEC network 140.

PDNs 160-A to 160-Y may each be associated with a Data Network Name (DNN) in 5G, and/or an Access Point Name (APN) in 4G. UE device 110 may request a connection to PDN 160 using a DNN or an APN. For example, UE device 110 may request a data flow connection to an application server 165 (shown in PDN 160-A). PDN 160 may include, and/or be connected to, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks. PDN 160 may include application server 165. Application server 165 may include one or more computer devices that host one or more applications and/or other types of services used by UE device 110. Core network 150 may establish a communication session between UE device 110 and application server 165 via RAN Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
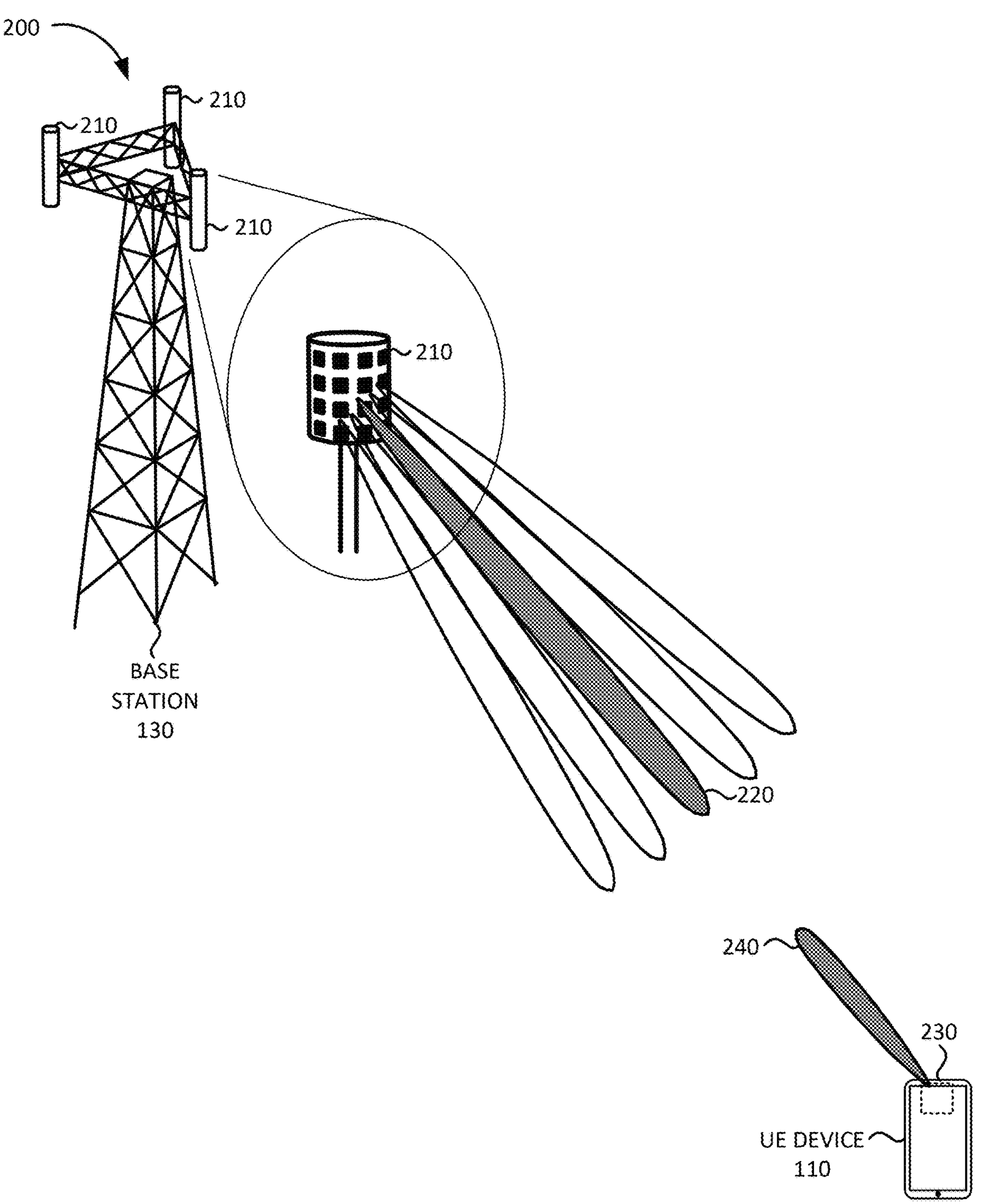
FIG. 2 is a diagram illustrating exemplary components of an environment that includes a base station and a user equipment (UE) device according to an implementation described herein.

FIG. 2 illustrates an environment 200 that includes base station 130 and UE device 110. As shown in FIG. 2, base station 130, which covers three 120° sectors, may include one or more antenna arrays 210. Antenna array 210 may include an array of controllable antenna elements configured to send and receive 5G NR wireless signals. The antenna elements may be digitally controllable to electronically tilt or steer an antenna beam in a vertical direction and/or horizontal direction. In some implementations, the antenna elements may additionally be controllable via mechanical tilting or steering using one or more actuators associated with each antenna element. The base station sector associated with antenna array 210 may serve multiple UE devices 110 and antenna array 210 may simultaneously generate multiple antenna beams.

A particular antenna beam 220 of the generated k antenna beams may serve one or more UE devices 110. Antenna beam 220 may extend in a direction toward UE device 110 being served by antenna beam 220. Antenna beam 220 may not point exactly in the direction of the location of UE device 110 but in a direction determined to result in the best possible signal quality (e.g., received power) perceived by UE device 110.

UE device 110 may also include an antenna array 230 and may be configured to generate an antenna beam 240 in the direction of base station 130 (e.g., in a direction determined to result in the best possible signal quality detected by base station 130). Base station 130 may performing adaptive beamforming using SPOA to configure antenna array 210 to receive beam 240. Similarly, UE device 110 may perform adaptive beamforming using SPOA to configure antenna array 230 to receive antenna beam 220.

Although FIG. 2 shows exemplary components of base station 130 and UE device 110, in other implementations, base station 130 and/or UE device 110 may include fewer components, different components, differently arranged components, or additional functional components than depicted in FIG. 2.

Figure 3:
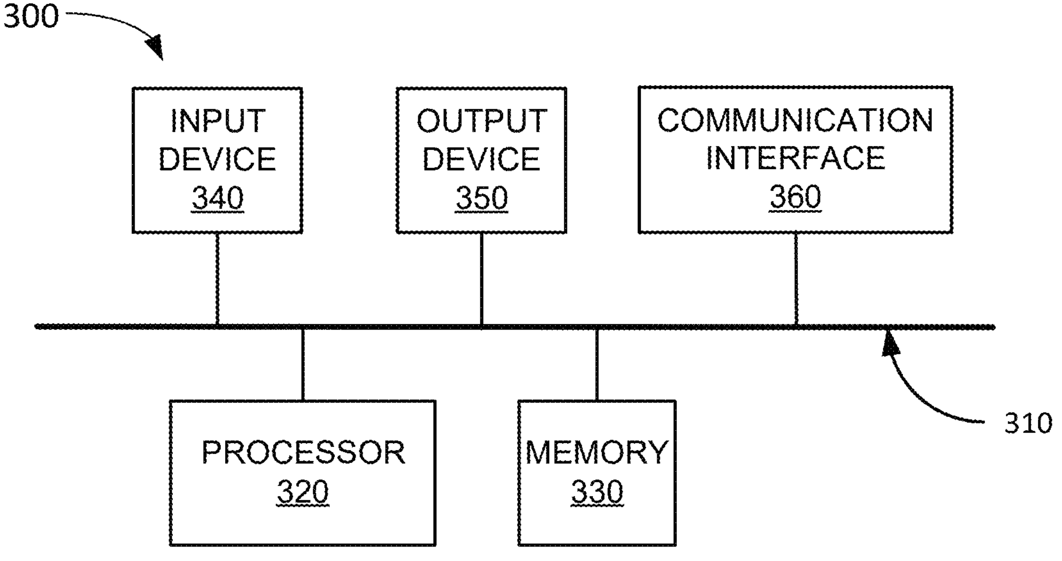
FIG. 3 illustrates exemplary components of a device that may be included in an environment according to an implementation described herein.

FIG. 3 is a diagram illustrating example components of a device 300 according to an implementation described herein. The components of FIG. 1 and/or FIG. 2 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to adaptive beamforming using stochastic gradient descent pufferfish optimization. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
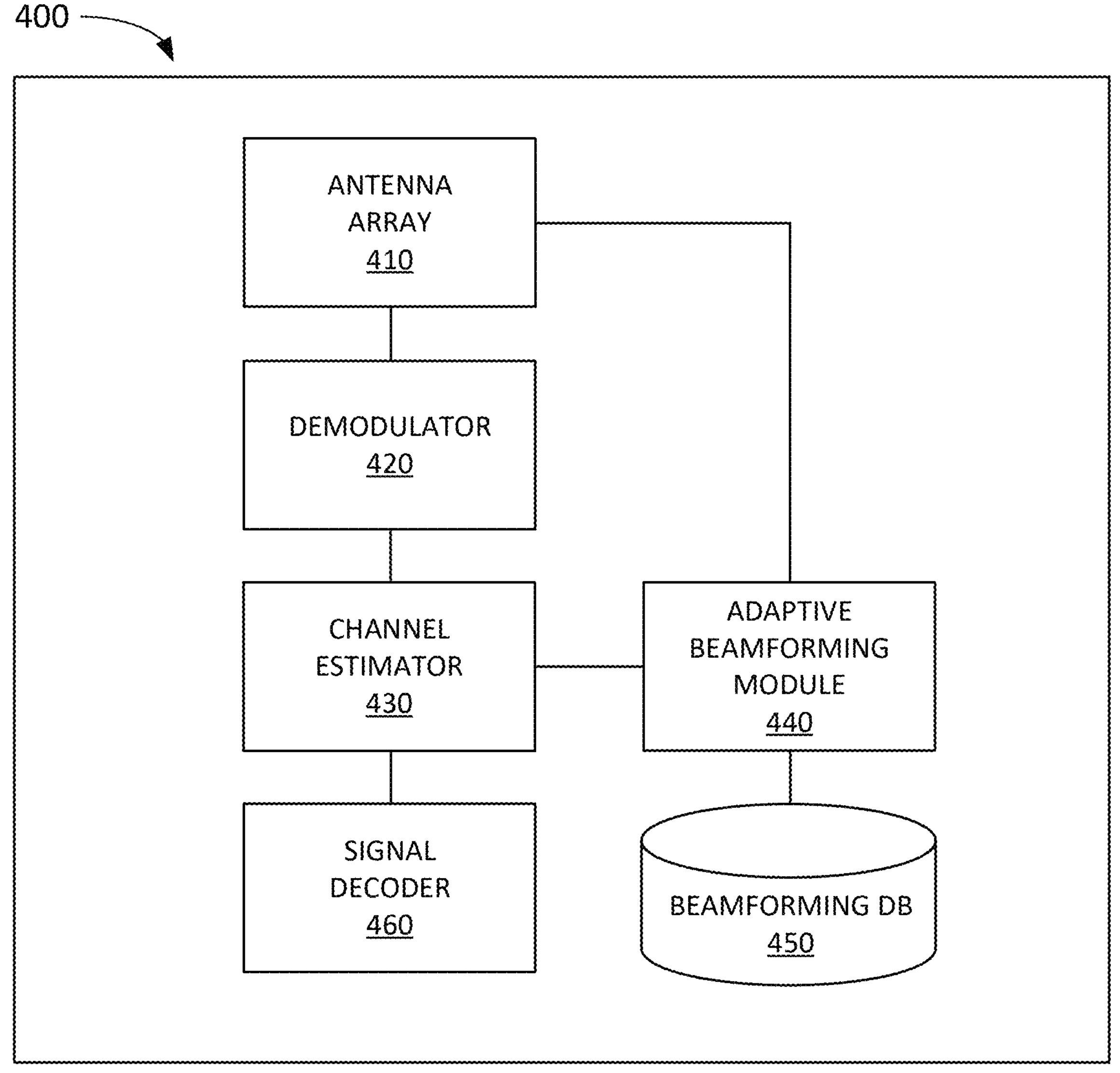
FIG. 4 illustrates exemplary components of a UE device or a base station according to an implementation described herein.

FIG. 4 illustrates exemplary components of an adaptive beamforming system 400 that may be implemented in UE device 110 and/or in base station 130. The components of adaptive beamforming system 400 may be implemented, for example, via processor 320 executing instructions from memory 330. For example, one or more components of adaptive beamforming system 400 may correspond to the structure of processor 320 together with instructions in memory 330 for implementing the functionality of the component. Alternatively, some or all of the components of adaptive beamforming system 400 may be implemented via hard-wired circuitry. For example, one or more components of adaptive beamforming system 400 may correspond to the structure of some or all of an ASIC, FPGA, and/or another type of integrated circuit. As shown in FIG. 4, adaptive beamforming system 400 may include an antenna array 410, a demodulator 420, a channel estimator 430, an adaptive beamforming module 440, a beamforming database (DB) 450, and a signal decoder 460.

Antenna array 410 may include a MIMO antenna array and may correspond to antenna array 210 of base station 130 or to antenna array 230 of UE device 110. The antenna array elements of antenna array 410 may be configured by adaptive beamforming module 440. Demodulator 420 may perform OFDM demodulation to retrieve individual subcarrier signals from an OFDM signal received via antenna array 410. Channel estimator 430 may perform channel estimation on received signals. For example, channel estimator 430 may apply an MMSE filter to the demodulated signals.

Adaptive beamforming module 440 may perform adaptive beamforming on antenna array 410 by adjusting weights for antenna array elements of antenna array 410 using SPOA based on received signals and previously determined weights. For example, adaptive beamforming module 440 may perform an SPOA process described below with reference to FIG. 6. Beamforming DB 450 may store information relating to adaptive beamforming. For example, beamforming DB 450 may store a most recently determined set of antenna weights, a set of received input signals, a set of pilot signals extracted from received input signals, a determined MMSE filtering matrix, a selected number of iterations for SPOA, a selected number of candidate solutions for SPOA, a step size for SGD used in SPOA, upper and lower bounds for each antenna weight, and/or other parameters used by adaptive beamforming using SPOA. Signal decoder 460 may decode codewords from subcarrier signals to retrieve information encoded in signals received by antenna array 410.

Although FIG. 4 shows exemplary components of adaptive beamforming system 400, in other implementations, adaptive beamforming system 400 may include fewer components, different components, additional components, or differently arranged components than depicted in FIG. 4. Additionally, or alternatively, one or more components of adaptive beamforming system 400 may perform one or more tasks described as being performed by one or more other components of adaptive beamforming system 400.

Figure 5:
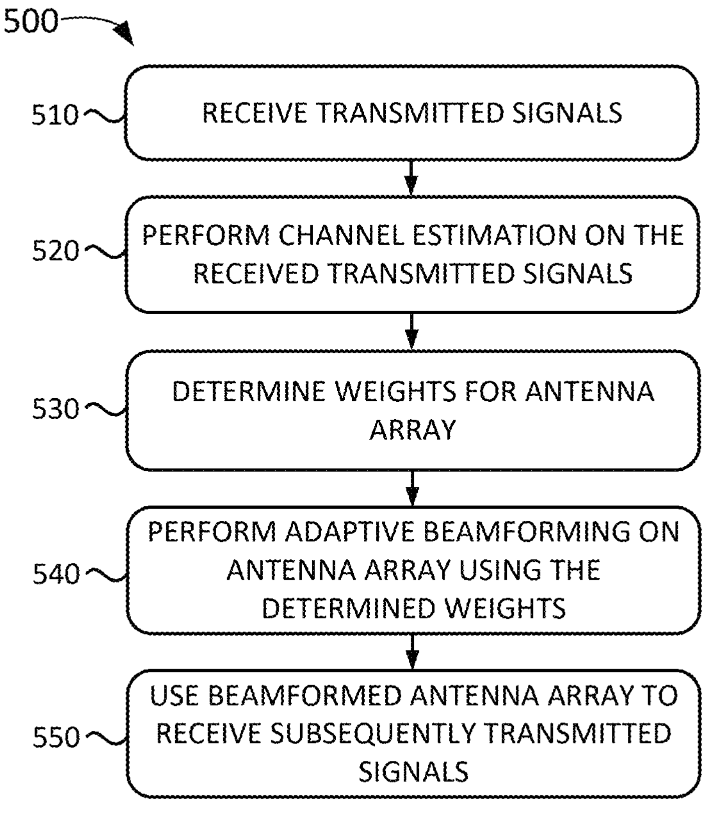
FIG. 5 illustrates a flowchart of a process for adaptive beamforming according to an implementation described herein.

FIG. 5 illustrates a flowchart of a process 500 for adaptive beamforming. In some implementations, process 500 of FIG. 5 may be performed by base station 130. In other implementations, process 500 of FIG. 5 may be performed by UE device 110. In yet other implementations, some or all of process 500 may be performed by another device or a group of devices separate from UE device 110 and/or base station 130.

As shown in FIG. 5, process 500 may include receiving transmitted signals (block 510) and performing channel estimation on the received transmitted signals (block 520). For example, antenna array 410 may receive signals transmitted by another antenna array. Adaptive beamforming system 400 may apply MMSE filtering, and/or another type of filtering, on the received signals to perform channel estimation. MMSE filtering may average out the effects of noise on the pilot signals included in the received signals.

Process 500 may further include determining weights for an antenna array (block 530). For example, adaptive beamforming system 400 may use an optimization algorithm, such as, for example, SPOA, to determine antenna weights for antenna array 410 based on previously determined antenna weights and the received and filtered signals. An exemplary process of using SPOA is described below with reference to FIG. 6.

Process 500 may further include performing adaptive beamforming on the antenna array using the determined weights (block 540) and using the beamformed antenna array to receive subsequently transmitted signals (block 550). For example, adaptive beamforming system 400 may apply the determined weights to antenna array 410 and beamformed antenna array 410 may receive subsequent transmitted signals using the applied weights.

Figure 6:
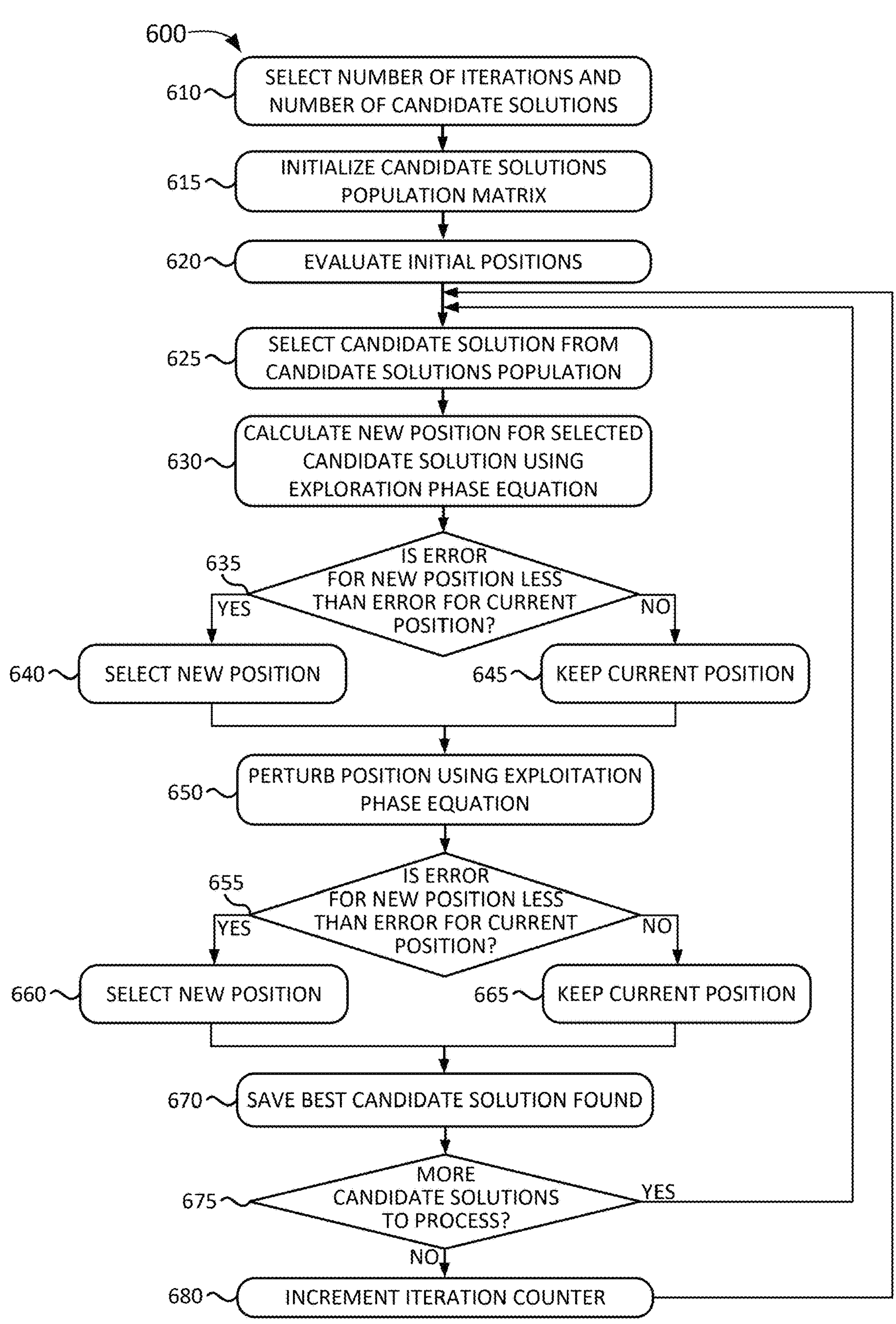
FIG. 6 illustrates a flowchart of a process for using stochastic gradient descent pufferfish optimization algorithm according to an implementation described herein.

FIG. 6 illustrates a flowchart of a process 600 for using stochastic gradient descent pufferfish optimization. In some implementations, process 600 of FIG. 6 may be performed by base station 130. In other implementations, process 600 of FIG. 6 may be performed by UE device 110. In yet other implementations, some or all of process 600 may be performed by another device or a group of devices separate from UE device 110 and/or base station 130.

As shown in FIG. 6, process 600 may include selecting a number of iterations and a number of candidate solutions (block 610). For example, adaptive beamforming system 400 in UE device 110, or in base station 130, may select a number of iterations to perform and the size S of candidate solutions population matrix Y from Eq. (7). Process 600 may further include initializing a candidate solutions population matrix (block 615) and evaluating the initial positions (block 620). For example, adaptive beamforming system 400 may use Eq. (8) to initialize the positions (i.e., values) of the elements of candidate solutions population matrix Y.

Process 600 may further include selecting a candidate solution from the candidate solutions population (block 625) and calculating a new position for the selected candidate solution using an exploration phase equation (block 630). For example, adaptive beamforming system 400 may select candidate solution $Y_j$ from candidate solutions population matrix Y and select a subset $DE_j$ of other candidate solutions $Y_k$ from candidate solutions population matrix Y using Eq. (9). Adaptive beamforming system 400 may then calculate a new position for selected candidate solution $Y_j$ by randomly selecting a candidate solution from the subset $DE_j$ of other candidate solutions $Y_k$ and using Eq. (14). Adaptive beamforming system 400 may use SGD to solve Eq. (14).

A determination may be made as to whether the error for the new position is less than the error for the current position (block 635). For example, adaptive beamforming system 400 may use Eq. (5) to calculate the error h (m), between the expected pilot signals and the pilot signals that are calculated using the received pilot signals and the determined antenna array weights, using the weights associated with the new position and the weights associated with the current position. Eq. (11) may then be used to select the position associated with the lower error.

If it is determined that the error for the new position is less than error for the current position (block 635—YES), the new position may be selected at the position for the selected candidate solution (block 640). If it is determined that the error for the new position is not less than error for the current position (block 635-NO), the current position may be selected as the position for the selected candidate solution (block 645).

Process 600 may further include perturbing the position of the candidate solution using an exploitation phase equation (block 650). For example, adaptive beamforming system 400 may use Eq. (16) to perturb the selected position of the selected candidate solution. A determination may be made as to whether the error for the new position is less than the error for the current position (block 655). For example, adaptive beamforming system 400 may use Eq. (5) to calculate the error h(m), between the expected pilot signals and the pilot signals that are calculated using the received pilot signals and the determined antenna array weights. Eq. (11) may then be used to select the position associated with the lower error.

If it is determined that the error for the new position is less than error for the current position (block 655—YES), the new position may be selected at the position for the selected candidate solution (block 660). If it is determined that the error for the new position is not less than error for the current position (block 655—NO), the current position may be selected as the position for the selected candidate solution (block 665).

Process 600 may further include saving the best candidate solution found so far (block 675). For example, adaptive beamforming system 400 may select the candidate solution $Y_j$ from candidate solutions population matrix Y associated with the lowest error. A determination may be made as to whether there are more candidate solutions to process (block 675). For example, adaptive beamforming system 400 may determine whether all candidate solutions $Y_j$ from candidate solutions population matrix Y have been processed.

If it is determined that there are more candidate solutions to process (block 675—YES), processing may return to block 625 to select another candidate solution from the candidate solutions population. If it is determined that there are no more candidate solutions to process (block 675—NO), the iteration counter may be incremented (block 680). Processing may return to block 625 to start a new iteration of selecting candidate solutions. Process 600 may continue for the specified number of iterations and/or until convergence of the solution based on a selected convergence criterion has been reached. The best solution found, namely the solution associated with the lowest error h(m) based on Eq. (5), is then selected as the determined solution for the weights for the antenna array.

Figure 7:
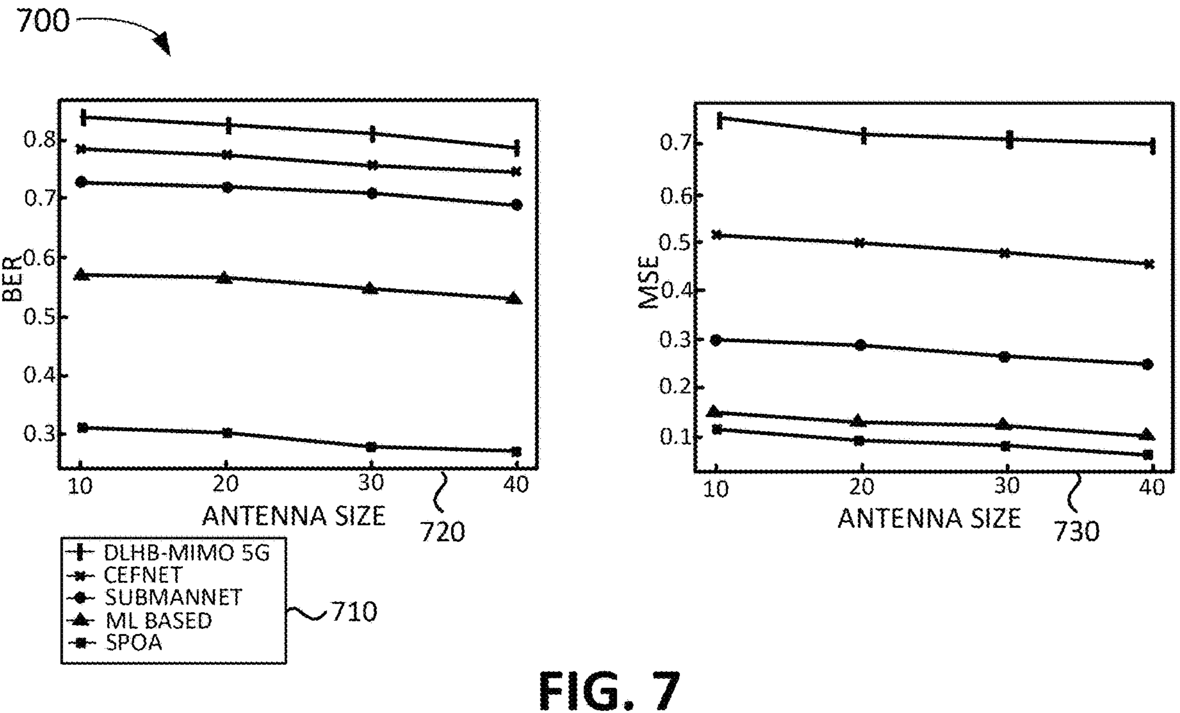
FIG. 7 illustrates a first set of performance plots according to an implementation described herein.

FIG. 7 illustrates a first set 700 of performance plots for a Rayleigh communication channel. Set 700 includes plots of BER and MSE for different adaptive beamforming methods. As shown in legend 710, plots 720 and 730 include plots for a DLHB for MIMO in 5G adaptive beamforming method, a CEFNet adaptive beamforming method, a SubManNet-based adaptive beamforming method, an ML based adaptive beamforming method, and a SPOA beamforming method as described herein. Plot 720 illustrates a plot of the BER versus the size of an antenna array for the Rayleigh communication channel. Plot 730 illustrates a plot of the MSE versus the size of an antenna array for the Rayleigh communication channel. As shown in FIG. 7, the SPOA method described herein results in lower BER and MSE for the Rayleigh communication channel.

Figure 8:
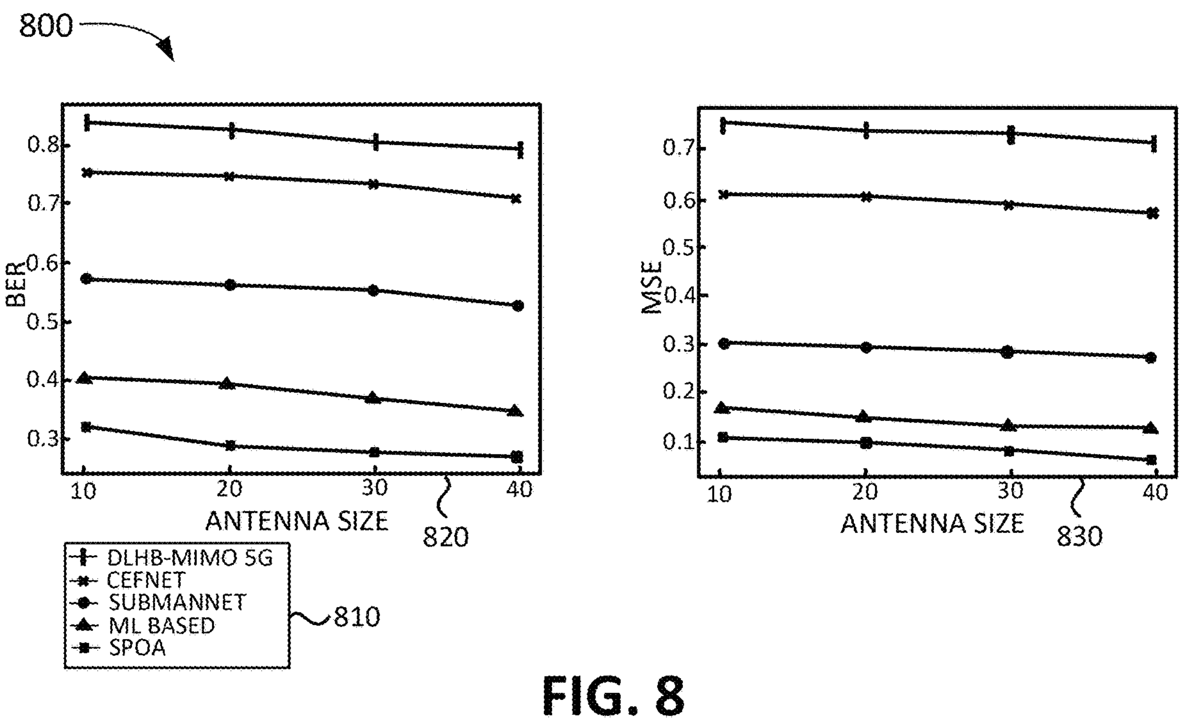
FIG. 8 illustrates a second set of performance plots according to an implementation described herein.

FIG. 8 illustrates a second set 800 of performance plots for a Rician communication channel. As shown in legend 810, plots 820 and 830 include plots for a DLHB for MIMO in 5G adaptive beamforming method, a CEFNet adaptive beamforming method, a SubManNet-based adaptive beamforming method, an ML based adaptive beamforming method, and a SPOA beamforming method as described herein. Plot 820 illustrates a plot of the BER versus an the size of an antenna array for the Rician communication channel. Plot 830 illustrates a plot of the MSE versus the size of an antenna array for the Rician communication channel. As shown in FIG. 8, the SPOA method described herein results in lower BER an MSE for the Rician communication channel.

Figure 9:
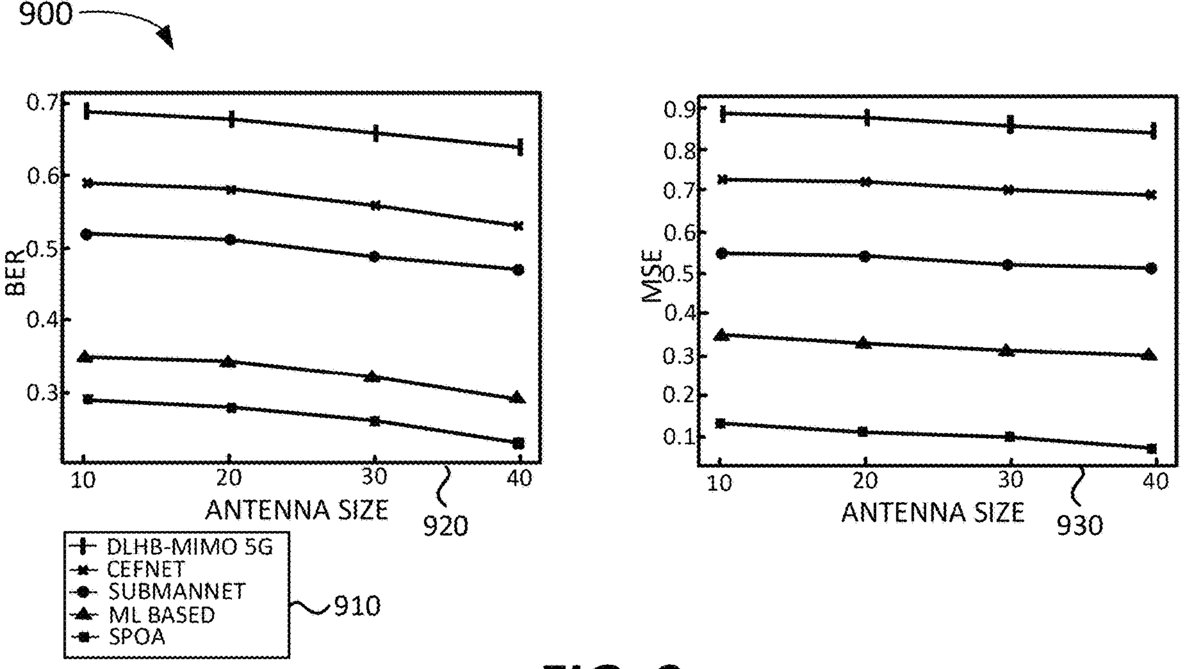
FIG. 9 illustrates a third set of performance plots according to an implementation described herein.

FIG. 9 illustrates a third set 900 of performance plots for a Nakagami communication channel. As shown in legend 910, plots 920 and 930 include plots for a DLHB for MIMO in 5G adaptive beamforming method, a CEFNet adaptive beamforming method, a SubManNet-based adaptive beamforming method, an ML based adaptive beamforming method, and a SPOA beamforming method as described herein. Plot 920 illustrates a plot of the BER versus the size of an antenna array for the Nakagami communication channel. Plot 930 illustrates a plot of the MSE versus the size of an antenna array for the Nakagami communication channel. As shown in FIG. 9, the SPOA method described herein results in lower BER an MSE for the Nakagami communication channel.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device, wireless signals transmitted by a transmitting antenna array;

determining, by the device, weights for a receiving antenna array based on the received wireless signals using a pufferfish optimization algorithm, wherein determining the weights includes calculating an estimated gradient descent of the weights using a randomly selected subset of data within an exploration phase of the pufferfish optimization algorithm;

performing, by the device, adaptive beamforming on the receiving antenna array using the determined weights; and using, by the device, the beamformed receiving antenna array to receive additional wireless signals transmitted by the transmitting antenna array.

2. The method of claim 1, wherein determining the weights for the receiving antenna array based on the received wireless signals using the pufferfish optimization algorithm includes:

solving the pufferfish optimization algorithm using stochastic gradient descent.

3. The method of claim 1, further comprising:

performing channel estimation based on the received wireless signals using a Minimum Mean Square Error (MMSE) algorithm.

4. The method of claim 1, wherein determining the weights for the receiving antenna array based on the received wireless signals using the pufferfish optimization algorithm includes:

generating a plurality of candidate solutions;

applying an exploration phase perturbation on a position associated with a candidate solution, of the plurality of candidate solutions, to determine a first new position based on a previous position;

applying a fitness criterion to determine whether to accept the determined first new position or to retain the previous position;

applying an exploitation phase perturbation on the accepted first new position or retained previous position associated with the candidate solution to determine a second new position based on the accepted first new position or retained previous position;

applying the fitness criterion to determine whether to accept the determined second new position or the accepted first new position or retained previous position; and selecting a best solution from the plurality of candidate solutions.

5. The method of claim 4, wherein applying the exploration phase perturbation on the position associated with the candidate solution includes:

randomly selecting another solution from the plurality of candidate solutions, wherein the other solution is associated with a better solution based on the fitness criterion; and calculating the first new position based on the randomly selected other solution and a stochastic gradient descent of the previous solution.

6. The method of claim 4, wherein applying the exploitation phase perturbation on the accepted first new position or retained previous position associated with the candidate solution includes:

calculating the second new position based on a random perturbation of the accepted first new position or retained previous position, wherein the random perturbation is selected from an interval of real numbers.

7. The method of claim 4, wherein the fitness criterion includes a criterion based on an error between an expected output and the weights for the receiving antenna array multiplied by values of the received wireless signals.

8. The method of claim 7, wherein applying the fitness criterion to determine whether to accept the determined first new position or to retain the previous position includes:

selecting the first new position when the first new position is associated with a smaller error; and selecting the previous position when the previous position is associated with the smaller error.

9. The method of claim 1, further comprising:

computing at least one of a bit error rate (BER) or a mean square error (MSE) for the received additional wireless signals; and determining performance of the adaptive beamforming by the receiving antenna array using the determined weights, based on the computed at least one of the BER or MSE for the received additional wireless signals.

10. A device comprising:

a processor configured to:

receive wireless signals transmitted by a transmitting antenna array;

determine weights for a receiving antenna array based on the received wireless signals using a pufferfish optimization algorithm, wherein the processor configured to determine the weights is configured to calculate an estimated gradient descent of the weights using a randomly selected subset of data within an exploration phase of the pufferfish optimization algorithm;

perform adaptive beamforming on the receiving antenna array using the determined weights; and use the beamformed receiving antenna array to receive additional wireless signals transmitted by the transmitting antenna array.

11. The device of claim 10, wherein, when determining the weights for the receiving antenna array based on the received wireless signals using the pufferfish optimization algorithm, the processor is further configured to:

solve the pufferfish optimization algorithm using stochastic gradient descent.

12. The device of claim 10, wherein the processor is further configured to:

perform channel estimation based on the received wireless signals using a Minimum Mean Square Error (MMSE) algorithm.

13. The device of claim 10, wherein, when, determining the weights for the receiving antenna array based on the received wireless signals using the pufferfish optimization algorithm, the processor is further configured to:

generate a plurality of candidate solutions;

apply an exploration phase perturbation on a position associated with a candidate solution, of the plurality of candidate solutions, to determine a first new position based on a previous position;

apply a fitness criterion to determine whether to accept the determined first new position or to retain the previous position;

apply an exploitation phase perturbation on the accepted first new position or retained previous position associated with the candidate solution to determine a second new position based on the accepted first new position or retained previous position;

apply the fitness criterion to determine whether to accept the determined second new position or the accepted first new position or retained previous position; and select a best solution from the plurality of candidate solutions.

14. The device of claim 13, wherein, when applying the exploration phase perturbation on the position associated with the candidate solution, the processor is further configured to:

randomly select another solution from the plurality of candidate solutions , wherein the other solution is associated with a better solution based on the fitness criterion; and calculate the first new position based on the randomly selected other solution and a stochastic gradient descent of the previous solution.

15. The device of claim 13, wherein, when applying the exploitation phase perturbation on the accepted first new position or retained previous position associated with the candidate solution, the processor is further configured to:

calculate the second new position based on a random perturbation of the accepted first new position or retained previous position, wherein the random perturbation is selected from an interval of real numbers.

16. The device of claim 13, wherein the fitness criterion includes a criterion based on an error between an expected output and the weights for the receiving antenna array multiplied by values of the received wireless signals.

17. The device of claim 16, wherein, when applying the fitness criterion to determine whether to accept the determined first new position or to retain the previous position, the processor is further configured to:

select the first new position when the first new position is associated with a smaller error; and select the previous position when the previous position is associated with the smaller error.

18. The device of claim 10, wherein the processor is further configured to:

compute at least one of a bit error rate (BER) or a mean square error (MSE) for the received additional wireless signals; and determine performance of the adaptive beamforming on the receiving antenna array using the determined weights based on the computed at least one of the BER or MSE for the received additional wireless signals.

19. A non-transitory computer-readable memory device storing instructions executable by a processor, the non-transitory computer-readable memory device comprising:

one or more instructions to receive wireless signals transmitted by a transmitting antenna array;

one or more instructions to determine weights for a receiving antenna array based on the received wireless signals using a pufferfish optimization algorithm, wherein the one or more instructions to determine the weights include one or more instructions to calculate an estimated gradient descent of the weights using a randomly selected subset of data within an exploration phase of the pufferfish optimization algorithm;

one or more instructions to perform adaptive beamforming on the receiving antenna array using the determined weights; and one or more instructions to use the beamformed receiving antenna array to receive additional wireless signals transmitted by the transmitting antenna array.

20. The non-transitory computer-readable memory device of claim 19, wherein the one or more instructions to determine the weights for the receiving antenna array based on the received wireless signals using the pufferfish optimization algorithm further include:

one or more instructions to solve the pufferfish optimization algorithm using stochastic gradient descent.

* * * * *